May 19, 1936.  R. CHILTON  2,040,833
TRANSMISSION
Filed Dec. 27, 1934  4 Sheets-Sheet 4

INVENTOR.
ROLAND CHILTON
BY
ATTORNEY.

Patented May 19, 1936

2,040,833

UNITED STATES PATENT OFFICE 2,040,833

TRANSMISSION

Roland Chilton, Ridgewood, N. J.

Application December 27, 1934, Serial No. 759,349

30 Claims. (Cl. 74—281)

My invention relates to variable speed transmissions, and is concerned more particularly with variable speed transmissions wherein driving members are loaded into non-slipping contact.

The invention comprises a new organization wherein rolling members have driving contacts subtending relatively variable pitch cone angles, and may be said to constitute a continuing development of that type of variable speed transmission described and illustrated in previously filed applications, to wit: Serial No. 669,144, filed May 3, 1933; Serial No. 728,056, filed May 29, 1934; Serial No. 742,751, filed September 7, 1934; Serial No. 742,752, filed September 7, 1934; Serial No. 743,515, filed September 11, 1934; and Serial No. 746,958, filed October 5, 1934.

The specific features of the present invention which should be emphasized are:

(a) The transmission is of double-sided form;

(b) It is of the rigid disc, tilting roller variety;

(c) The variable pitch cone angle contact member is the driven member;

(d) The small pitch cone angle member comprises a bevel gear, and is the fixed or reaction member;

(e) The large pitch cone angle member comprises a bevel gear, and is the driving member;

(f) The transmission is of the double roller type;

(g) The large and small angle bevel gears are applied to different sets of rollers;

(h) The roller bevel pinions are disposed at the inner ends of the rollers;

(i) The two sets of rollers are separated and drivably connected by intermediate annular driving rings;

(j) The rings comprise parts of the control mechanism;

(k) The control is hydraulic.

(l) Torque-responsive action is effected by a pump having a torque-loaded relief valve;

(m) The pump pressures are effective on the outer connecting rings, i. e., those urging the transmission to low gear (high ratio) wherefore loading of the relief valve is from the torque on the fixed or reaction member;

(n) A second pump is effective on the inner connecting ring, and the pressure in this system is proportioned from that in the first system by a piston in the latter and a relief valve in the former, connected by a floating pump having a movable fulcrum, comprising the control lever of the transmission.

Alternatives to items (a) to (i), inclusive, have been disclosed in my various copending applications above identified. The novel features and advantages of the present invention resides more particularly in the structures concerned with items (j) to (n), inclusive.

Other features of the invention will be pointed out hereinafter.

In the drawings, wherein like reference characters denote like or corresponding parts:

Figure 1:
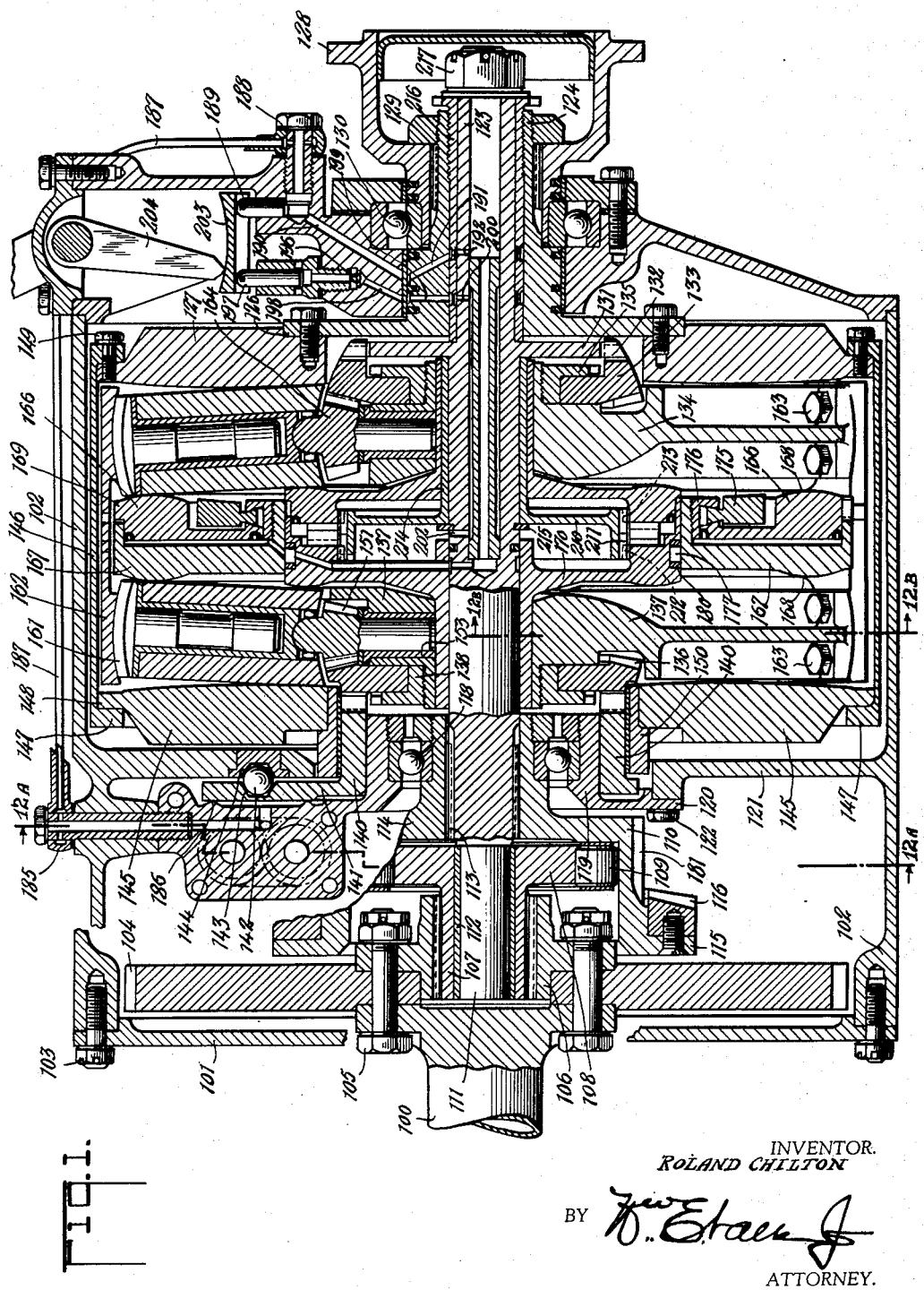
Fig. 1 is a longitudinal section on the line 11—11 of Fig. 2.
Figure 3:
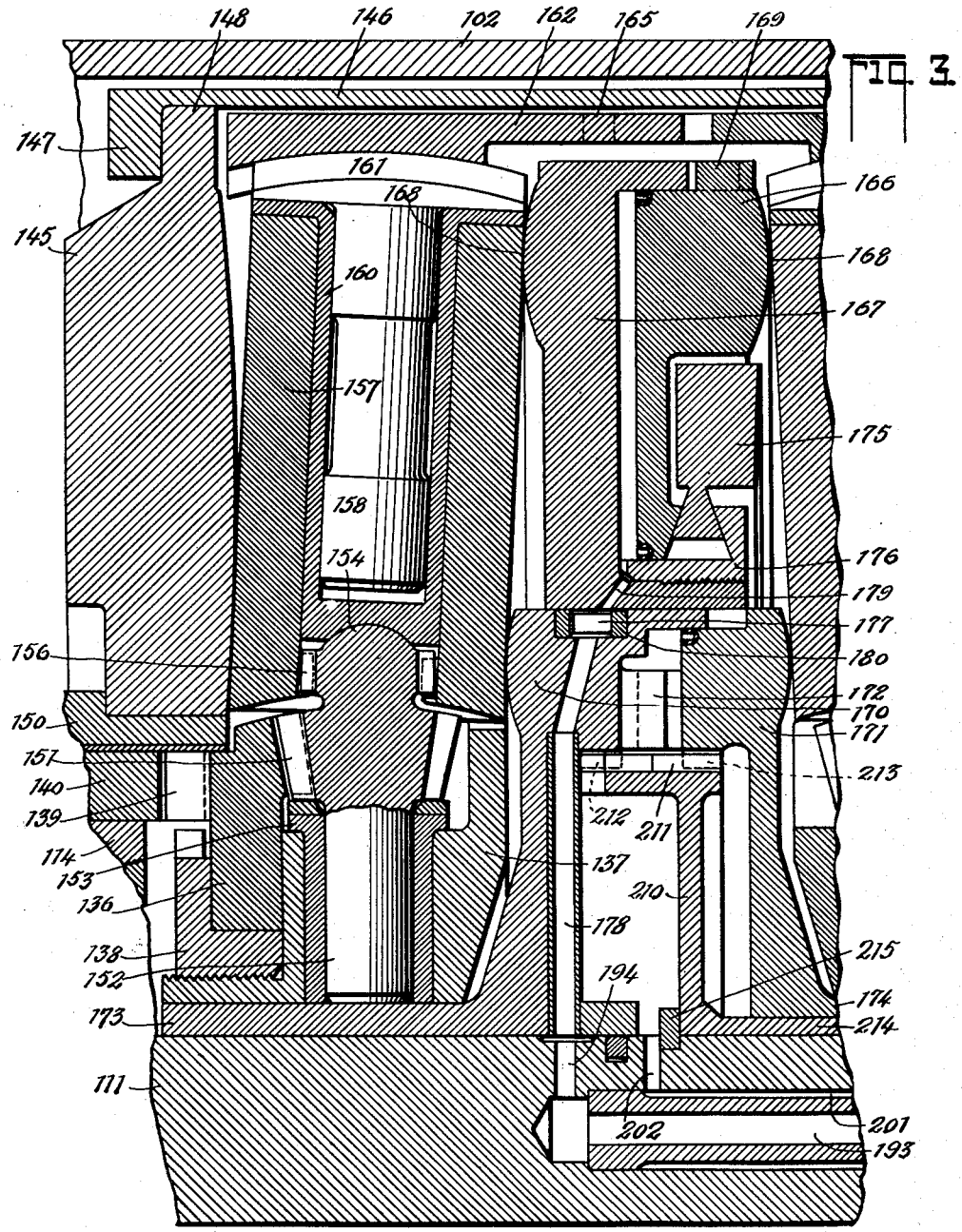
Figures 4, 5:
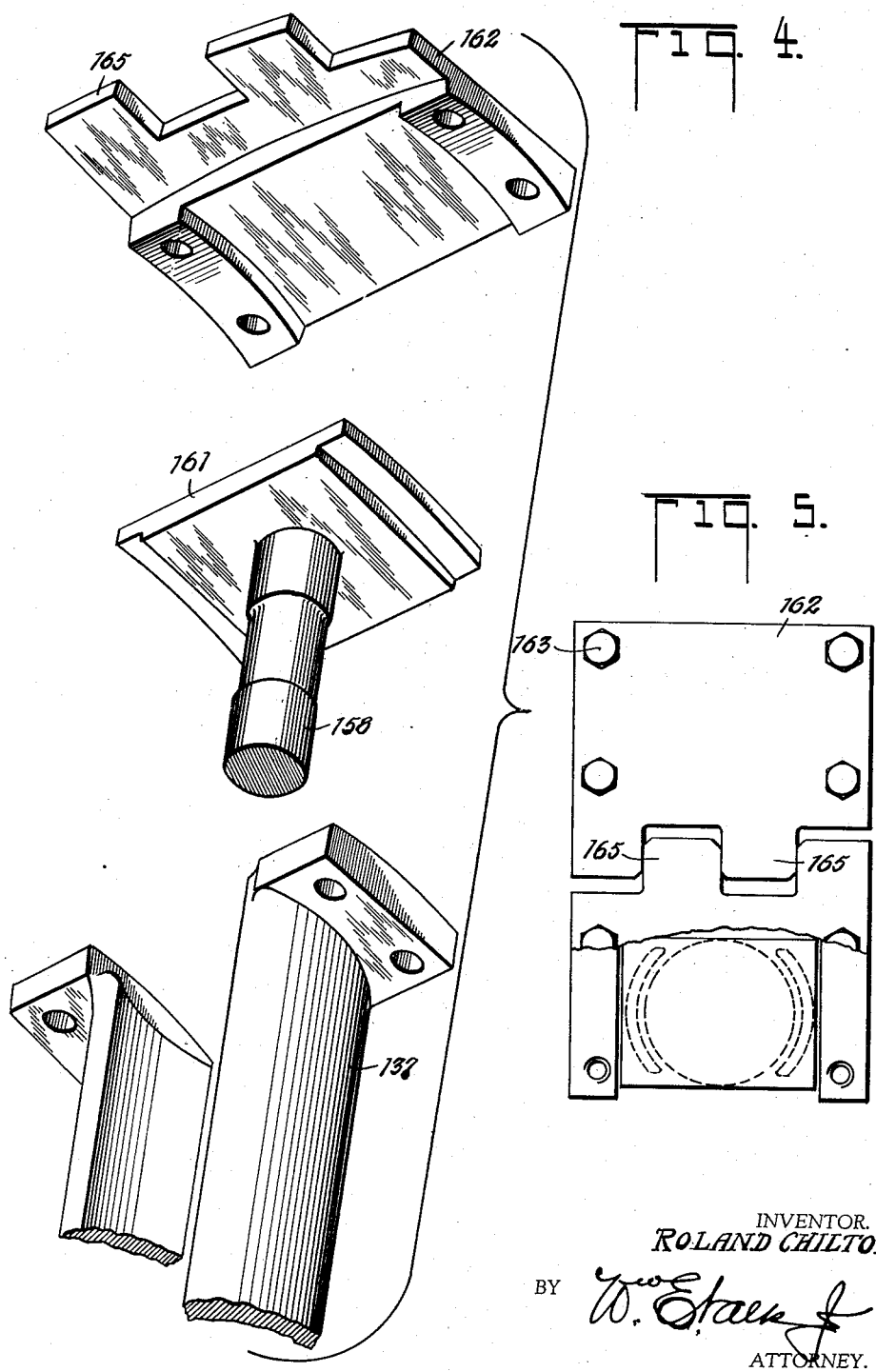

Fig. 3 reproduces a portion of the section of Fig. 1 on an enlarged scale;

Fig. 4 is an isometric view of the rockable roller spindle mechanism; and

Fig. 5 is a detail view showing the driving connection between the cage spindle caps.

In its broadest aspect the present invention is generally similar to the several embodiments described and illustrated in said previously filed applications in that it includes radial rollers supported in a cage and engaged by large, small, and variable pitch cone angle members, respectively. It comprises a driving means, a driven means, a fixed or reaction means, and a rotationally floating means. Specifically, the small angle member is normally fixed to constitute the reaction member; the large angle member constitutes the driving member; the variable contact angle member constitutes the driven member; while the rollers shown are free to planetize with respect to these various members. Such a disposition gives a variable speed ratio range extending from 1 to 0, to 1 to 1, and, if desired, therebeyond into reverse or over-speed ratios, or, as one alternative, the variable angle contact member may be fixed, in which case the ratio range extends from 1 to 1 in both directions to infinity, giving a range of zero to infinitely fast rotation of the driven member (the latter being impossible of practical realization, although within the actual, theoretical kinematic properties of the organization).

Figure 2:
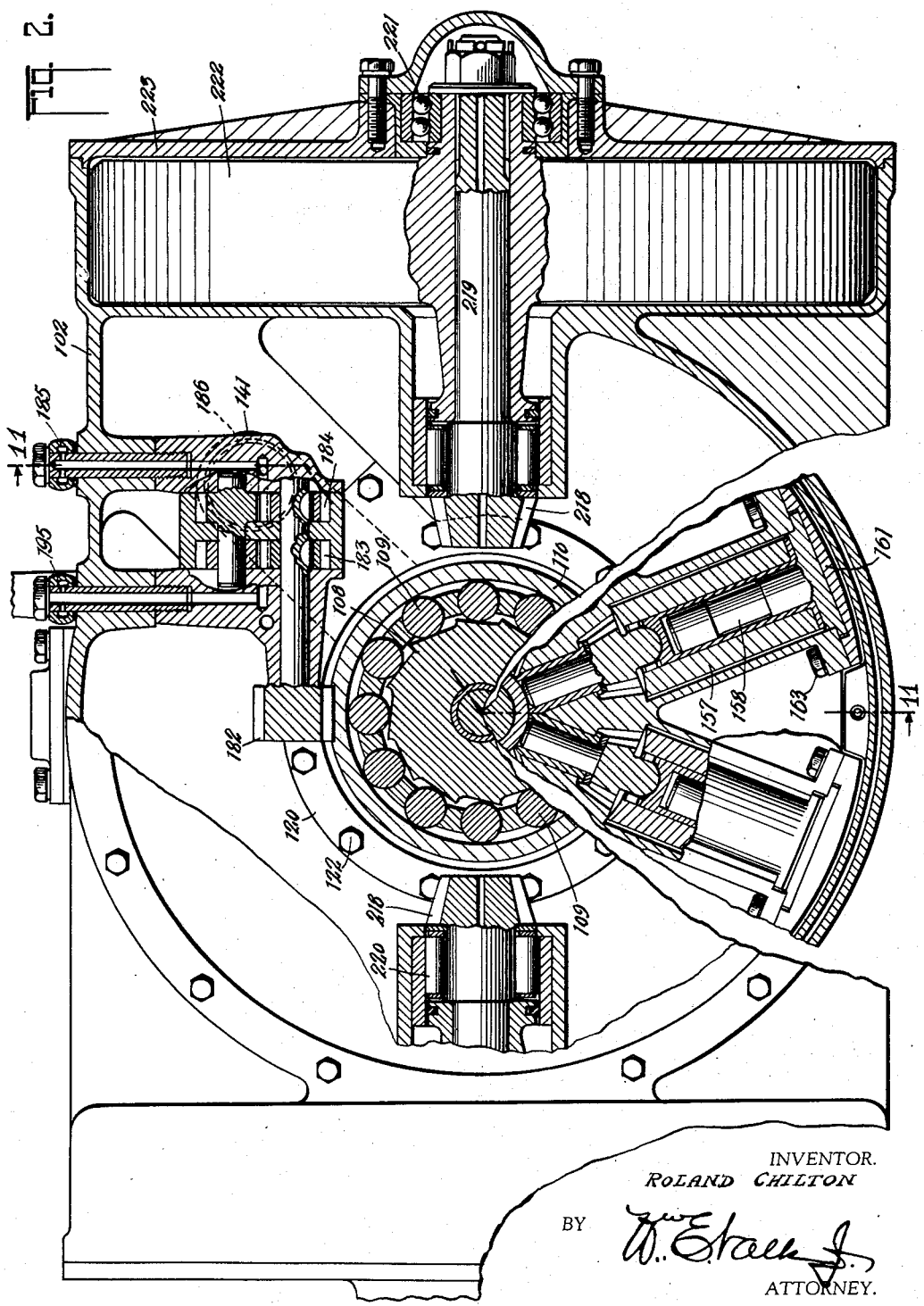
Fig. 2 is an axial view in which the left hand part is in outside view; the right hand part is in section on the line 12a—12a of Fig. 1, while the lower segment is a fragmentary section on the line 12b of Fig. 1, with a portion shown in outside view.

Referring first to Fig. 1, 100 represents the crankshaft end of a conventional engine, equipped with a back plate 101, to which a main housing 102 of the transmission is secured by studs 103. The crankshaft 100 carries the usual flywheel 104 secured by bolts 105, which also secure a main driving member 106. In this member there is splined a hub 107 of a roller clutch cam 108, cooperating with rollers 109, and a cylindrical portion 110, to form a conventional one-way clutch. A main or driving shaft 111 is provided with a bushing 112 whereby the shaft is piloted within the clutch cam 107, 108, and this main shaft is further provided with splines 113, carrying a hub 114 of the member 110 which has an external flange 115 to which is secured a bevel gear 116. This end of the shaft 111 is supported in a bearing 118 clamped in a sleeve 119 of a cover plate 120 secured to the front wall 121 of the housing 102 by bolts 122 (Fig. 2).

At its rear end the main shaft 111 has an extension 123 on which is piloted a driven sleeve 124 having a flange 126 bolted to a rear driven member 127 as shown. The sleeve 124 has splined upon it a coupling member 128 secured by a nut 129 which also serves to clamp a bearing 130 whereby the driven member assemblage is located axially relative to the housing.

The driving shaft 111 is further provided with a flange 131, to the exterior of which there is drivably engaged by dogs 132, a (preferably non-metallic) driving gear 133 located between a cage 134 and a thrust nut 135 thereon, and engaging the bevel pinion 164.

The reaction member of the transmission comprises a bevel gear 136, located between a second cage 137 and a thrust nut 138 thereon and provided with dogs 139, slidably engaging companion dogs in a sleeve 140 having a torque arm 141, which is restrained from rotation by a ball 142 cooperating with sloping pockets 143 formed in the arm 141, and in an opposing button 144 set in the front wall 121.

A front end driven disc 145 is tied to the rear driven disc 127 by an encircling drum 146. This drum is provided with inturned projections 147 cooperating with mating projections 148 on the driven discs 145—127 comprising a bayonet type joint secured by screws 149. The forward end of the driven member assemblage is supported on a bushing 150 free to rotate on the sleeve 140 of the reaction member torque arm.

Meshed with the reaction gear 136 are a plurality of bevel pinions 151 integral with journals 152 supported in long bushings 153 in the cage 137, and each pinion is provided with a spherical head 154 provided with short splines 156, engaged, for slight angular freedom, with splines in the inner ends of the rollers 157. The rollers are supported for rotation on spindles 158 on bushings 160, the spindles being integral with rectangular heads 161, which are of arcuate profile about the center of the splines 156 of the bevel pinions 151. The exterior of the cage 137 is profiled to similar radius, and a cap 162 of similar arcuate profile has an arcuate recess accommodating the integral head 161, when the cap is secured on the cage by the cap screws 163.

By this construction, which is also illustrated in the isometric view of Fig. 4, each roller and spindle assembly is free for slight tipping action in its own radial plane, but is rigidly held to radial alignment with the corresponding pinion shaft as will be clear from Fig. 4 and the lower segment of Fig. 2.

The construction of the rollers of the rear cage 134 is similar to that already described for the front cage assembly. The two cages are connected together for unitary rotation (within and independently of, the drum 146) by interlocking extensions 165 on the caps 162, whereby the cages are free for slight axial movement. (Fig. 5.)

Engaged between the outer ends of the two sets of rollers is an annular piston member 166 cooperating with an annular cylinder member 167, each having similar crowned annular contact faces 168 engaging the outer ends of the respective sets of rollers. The member 166 is splined at 169 for rotation with the member 167, these members comprising a composite driving ring between the outer ends of the rollers.

Rotationally free within this outer ring is a similar composite driving ring between the inner ends of the rollers, comprised by the members 170—171 which have engaging end splines 172, and are free for rotation on the driving shaft 111 on sleeves 173 and 174 on which the cages 137—134 are also rotationally free.

The outer intermediate ring 166 is provided with segmental centrifugal weights 175 having a tapered engagement between that member and the annular nut 176. Both intermediate members are provided with U-section hydraulic packing rings, as shown, to prevent oil leakage, and the inner member 170 is further provided with an exterior groove 177 with which the oil passages 178—179 communicate, the groove being sealed by suitable rings 180.

Formed on the one-way clutch member 110 are helical gear teeth 181 engaging the helical pinion 182 (Fig. 2) which drives the oil pumps 183—184. The delivery of the latter communicates both with the external connection 185, and to a large diameter valve seat 186 formed in the pump body, with which seat there cooperates the flat face of the torque arm 141, so that, due to the action of the ball 142 in the inclined pockets 143—144 any tendency of the torque arm to rotate, in either direction, will move it to the left of Fig. 1 against the hydraulic pressure existing over the area of the valve seat 186. This flat-ended torque arm accordingly forms a relief valve for the pump 184 whereby the pressure delivered by this pump is always proportional to the torque on the reaction gear 136, which is anchored exclusively through the torque arm 141. This torque responsively regulated pressure is led, through the external pipe 187 by the connection 188 to the under side of the pressure-responsive plunger 189, and this pressure is at all times effective on the piston area of the outer connecting rings 166—167 by way of the passages 190, 191, 192, 193, 194 and finally through the passages 178, 179 already described.

Similarly, the other pressure pump 183 delivers to the connection 195 (Fig. 2) and by an external pipe (not shown) to the passage 196 beneath the relief valve plunger 197, and from thence to the piston area of the inner intermediate rings 170, 171, through the passages 198, 199, 200, 201 and 202.

The pressure-responsive plunger 189, and the relief valve plunger 197 are connected by the floating rocking beam 203 with which is engaged the V-shaped end of the control lever 204 which comprises a movable fulcrum for this pressure proportioning beam.

It will now be seen that there are two individual hydraulic systems, one effective on the piston area of the outer intermediate rings, and the other on the piston area of the inner intermediate rings. The pressure in the outer system is at all times proportional to the torque on the reaction gear 136, the torque arm of which comprises the relief valve of the pump by which this "outer" system pressure is generated. The pressure in the "inner" system is proportioned to the pressure in the "outer" system since the restraining load on the "inner" system relief valve 197 is derived from the pressure on the plunger 189 of the "outer" system, this proportion being determined by the position of the control lever 204 along the floating rocking beam 203. It should be noticed that the plunger 189 in no way modifies the pressure in the "outer" system which is determined exclusively by the reaction gear torque, this plunger 189 serving merely as the datum from which the pressure in the outer system is proportioned by the control lever.

The slope of the ball pockets 143, 144; the radius of these pockets in the torque arm 141; the area of the valve seat 186 and the piston area of the "outer" intermediate members are so proportioned that the contact pressure on these outer rings is always sufficiently in excess of the instantaneous driving load thereon as to prevent slippage. It should now be obvious that, if, for example, the piston area of the "inner" intermediate ring were made equal to that of the outer rings, then the rocking action of the rollers would transfer their contact points against the driven discs, from end to end, in direct proportion to the movement of the control lever from end to end of the rocking beam. This proportion will not be direct with unequal piston areas, which would merely modify the position of the control lever for any specific ratio position, without departing from the important characteristic that the pressure on the driven member is the sum of the pressures on the intermediate members. If the contact of these last members is on the pitch cone angles of the driving and reaction bevel gears respectively, then the torque transmitted by each will equal the torque on the respective gears, and we have already seen that the torque on the driven member is the sum of these torques, whereby the contact load at each driving contact is proportional to the instantaneous force being transmitted thereat in all ratio positions, and despite variations in the power transmitted.

From the large circumference of the relief valve seat 186 of the outer system, it will be clear that the height of the opening required to relieve the pressure to a low figure will be very small, and that hence the parts may be adjusted for a very small backlash at the torque arm.

A refinement, as a precautionary measure to locate the mean position of the "inner" intermediate rings 170, 171, and to limit them to equal and opposite motion, to ensure that there will be no errors in the equal and opposite tilting of the two sets of rollers, as might occur from bodily longitudinal acceleration of the whole transmission, will now be described. It comprises a locating member 210 which is equipped with "herring bone teeth" 211 of equal and opposite helix angle engaging right and left hand internal teeth or splines 212, 213 formed in the members 170, 171; and is located axially on the main shaft 111 on the sleeve 214 between the ring 215 and the flange 131. This main shaft in turn is located axially relative to the transmission as a whole by the long bushing 216 screw-threaded as shown into the driven sleeve 124 which has already been described as axially located in the transmission by the bearing 130. The nut 217 completes this location of the shaft 111 while the screw threads on the bushing 216 permit of a fine adjustment whereby the rollers may be brought to equal angularity at initial assembly. It should be clear that, as the members 170, 171 are splined together at 172 against relative rotation and have right and left hand connections of equal helix angle with the axially located member 210, these intermediate members are restrained to equal and opposite movement, and are positively prevented from unitary displacement which would upset the accurate angular relation of the rollers.

From the foregoing, as well as from the mode of operation as set forth in said companion applications, the operation of the instant organization should be obvious. By rocking the rollers to shift the point of contact longitudinally of the roller length, the driving ratio is progressively shifted from 1 to 1, to 1 to 0, or vice versa. Shift of the roller contact is obtained hydraulically through manipulation of the control lever 204.

It remains to be mentioned that this complete showing includes bevel pinions 218 (Fig. 2) integral with shafts 219 supported in suitable bearings 220 and 221, which carry massive flywheels 222 housed in suitable extensions of the housing provided with cover plates 223. These flywheels comprise a regenerative transmission system fully disclosed in a companion application, and not included in the annexed claims wherefore further description is unnecessary. It should be mentioned, however, that the inclusion of the one-way drive clutch between the engine and the driving shaft has to do with this regenerative system.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a transmission, in combination, opposed annular discs, rollers rockably engaging said discs, rings in rolling driving contact with said rollers, and means associated with said rings adapted to effect said rocking.

2. In a transmission, in combination, opposed annular discs, rollers rockably engaging said discs, intermediate rings drivably connecting said rollers, and hydraulic means associated with said rings adapted to effect said rocking.

3. In a transmission, in combination, opposed annular discs rigidly spaced, rollers engaging the respective discs, and axially separable rings drivably connecting said rollers.

4. A transmission including, in combination, planetary bevel pinions, rollers rockable with respect to said pinions, means to rock said rollers and a driving coupling between said rollers and pinions organized to permit of said rocking.

5. In a transmission, axially separable driving rings, and means including an axially located member having splined engagement with respective rings of equal but opposite helical angles to restrain said rings to equal and opposite movement.

6. In a transmission, in combination, rockable rollers, and roller drive rings including pistons adapted to effect said rocking by fluid pressure acting on said pistons.

7. In a transmission, in combination, opposed annular discs, rollers rockably engaging said discs, rings intermediately located between and in rolling driving contact with said rollers, and means to effect said rocking by relatively moving said rings.

8. In a transmission, the combination with axially separable drive members restrained from relative rotation, of an axially located member having equally and oppositely inclined helical splines engaging the respective members.

9. In a transmission, a reaction member, a pressure pump, a pressure relief valve comprising a reactive abutment for said member, a second pump, a relief valve for said second pump, means to load the last said valve in proportion to the pressure developed by the first said pump, and control means to vary said proportion at will.

10. In a transmission having members to be loaded into non-slipping driving contact, a loading means comprising a piston, a pressure pump serving said piston, and a pressure control valve for said pump subject to load derived from the torque on one of said drive members.

11. A torque-responsive contact load means for transmission drive members including in combination, a pump, a pressure relief valve therefor, and means to apply to said valve a force proportional to the driving reaction on one of said members.

12. In a transmission, in combination, a drive member, a pressure pump, a drive member loading piston subject to pump pressure, a pressure relief valve, and means to load said valve in proportion to the driving effort on said member.

13. The combination with transmission members including a rocker to be loaded and shifted, of pistons effective at respective ends of said rocker, pumps adapted to hydraulically load the respective pistons, means adapted to vary the pressure from one of said pumps in proportion to the torque on one of said drive members, and control means adapted to proportion the relative pump pressures.

14. In a transmission, in combination, drivably contacted members, two contact load pistons, fluid pumps serving the respective pistons, automatic means to vary the pressure of one said pump in proportion to the torque on the associated member, and control means to vary at will the relative pressure of the other pump.

15. In a transmission, a reaction member, a pressure pump, and a pressure relief valve comprising a reactive abutment for said member whereby the pressure generated by said pump is automatically proportioned to the instantaneous reaction load on said member.

16. In a transmission, a reaction member, a pressure pump, a pressure relief valve comprising a reactive abutment for said member, a second pump, a relief valve therefor, and means to load the last said valve in proportion to the pressure developed by the first said pump.

17. In a transmission, the combination with a rotary member comprising a fluid operated piston, of means to balance the effect of centrifugal force on the fluid comprising centrifugal weights organized to impress an opposing force upon the piston.

18. In a transmission, in combination, opposed annular discs, a roller rockably engaging one said disc, a roller rockably engaging the other said disc, rings intermediately located between and drivably connecting said rollers, and means to axially separate said rings to effect said rocking.

19. In a transmission, in combination, opposed annular discs, a roller rockably engaging one said disc, a roller rockably engaging the other said disc, said rollers being rockable toward and from one another at their respective ends, rings intermediately located between and drivably connecting said rollers, and means to axially separate said rings to effect said rocking.

20. In a transmission, in combination, opposed annular discs, rollers rockably engaging said discs, a pair of rings intermediately located between and in rolling driving contact with said rollers, said rings being axially movable to effect said rocking, and means to control the relative movement of said rings.

21. In a transmission, in combination, opposed annular discs, rollers engaging the respective discs, and means intermediately located between and in rolling driving contact with said rollers.

22. In a transmission, in combination, axially separable driving rings, and means including a member having splined engagement with said rings to restrain said rings to equal and opposite movement.

23. In a transmission, in combination, opposed annular discs, a roller rockably engaging one said disc, a roller rockably engaging the other said disc, a pair of outer rings intermediately located between and drivably connecting said rollers adjacent to their outer ends, a pair of inner rings intermediately located between and drivably connecting said rollers adjacent to their inner ends, and means to axially separate one or the other of said pairs of rings to effect said rocking.

24. In a transmission, in combination, opposed annular discs, a roller rockably engaging one said disc, a roller rockably engaging the other said disc, a pair of interconnected rings intermediately located between and drivably connecting said rollers adjacent to one end thereof, a pair of interconnected rings intermediately located between and drivably connecting said rollers adjacent to the opposite end thereof, and means to axially move one said pair of rings toward one another as the other said pair of rings is axially separated and vice versa, the relative movement of said pairs of rings being adapted to effect said rocking without disturbing the driving connection between said rollers which said pairs of rings afford.

25. In a transmission, in combination, planetary bevel pinions, rollers rockable with respect to said pinions, and a splined connection between each said roller and its associated pinion organized for unitary rotation of said rollers and pinions in all rocked positions of said rollers.

26. In a transmission, in combination, a planetary carrier, a bevel pinion organized to planetize with said carrier, a roller rockable with respect to said pinion, a driving connection between said pinion and roller organized to permit of said rocking, and means for guiding the rocking movement of said roller movable with said carrier.

27. A rockable support for a transmission roller comprising, in combination, an annular cage member having arcuate slots, and a roller spindle having an arcuate integral head portion engaged within said slots and movable crosswise said member.

28. In a transmission, a planet carrier having an arcuate profile, a cap secured to the profile of said carrier and defining therewith opposed arcuate guide slots, a planetary spindle radially disposed with respect to said guide slots and having a head portion engaged therein, and a roller coaxial with and rotatable on the spindle axis.

29. In a transmission, in combination, a roller spindle having a substantially rectangular head, arcuate in lateral aspect, a roller coaxial with and rotatable on the spindle axis, and a carrier member having guides engaging said arcuate head.

30. In a transmission, in combination, a rotary member including a fluid-operated piston, and means movable both with and with respect to said piston to impress thereon a force effective to balance the centrifugal force on the fluid resulting from said rotation.

ROLAND CHILTON.